United States Patent

Smythies

[11] 3,915,990
[45] Oct. 28, 1975

[54] TRYPTAMINES
[75] Inventor: John R. Smythies, Birmingham, Ala.
[73] Assignee: Nelson Research & Development Co., Irvine, Calif.
[22] Filed: Feb. 11, 1974
[21] Appl. No.: 441,299

Related U.S. Application Data
[63] Continuation-in-part of Ser. No. 340,698, March 13, 1973, abandoned.

[52] U.S. Cl. ..... 260/326.15; 260/296 A; 260/309.2; 260/326.13 R; 260/326.16; 260/326.31; 424/273; 424/274
[51] Int. Cl.² .................................... C07D 209/16
[58] Field of Search ................ 260/326.15; 340/698

[56] References Cited
UNITED STATES PATENTS
2,995,566  8/1961  Sletzinger et al. ............. 260/326.15

OTHER PUBLICATIONS
C.A. 75 : 48,811r, (1971), Shvedov et al.

*Primary Examiner*—Sherman D. Winters
*Attorney, Agent, or Firm*—Martin A. Voet

[57] ABSTRACT
Substituted indoles and benzimidazoles having serotonin blocking activity and having the structural formulae

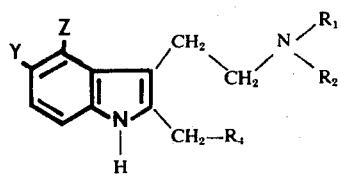

and

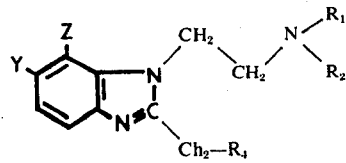

wherein one and only one of Y or Z is —OR$_3$ and wherein R$_1$, R$_2$ and R$_3$ is H or lower alkyl, and wherein R$_4$ is a phenyl group or phenyl group substituted with lower alkyl, lower alkoxy, halogen, CF$_3$, NH$_2$, NO$_2$, CN, —NH-lower alkyl or

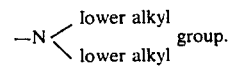

7 Claims, No Drawings

TRYPTAMINES

RELATION TO EARLIER FILED APPLICATIONS

This application is a Continuation-in-part of U.S. Ser. No. 340,698 filed Mar. 13, 1973, now abandoned.

BACKGROUND OF THE INVENTION

The present invention relates to substituted indoles and substituted benzimidazoles. More particularly, the present invention relates to substituted indoles and benzimidazoles useful as therapeutic agents.

SUMMARY OF THE INVENTION

The present invention comprises a compound having serotonin blocking activity and having one of the following structural formulae

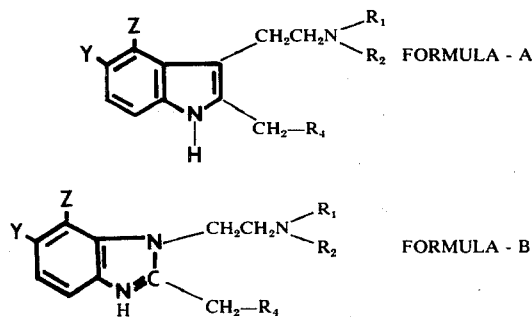

in which one and only one of Y or Z is $-OR_3$ and in which each of $R_1$, $R_2$ and $R_3$ is H or a lower alkyl group having 1 to about 8 carbon atoms and preferably an alkyl group containing not more than 5 carbon atoms, particulary methyl, ethyl or propyl; and $R_4$ is an unsubstituted or substituted phenyl group of the formula

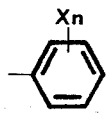

in which $n$ is 0–5 and X is H, a lower alkyl or lower alkoxy group having 1 to about 8 carbon atoms, halogen, $CF_3$, $NH_2$, $NO_2$, $CN$, NH-lower alkyl, or

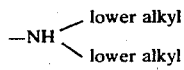

each X being the same or different. When any of X is a lower alkyl or lower alkoxy group, such group advantageously contains not more than 6 carbon atoms and preferably not more than 2 carbon atoms, that is, $-CH_3$, $-C_2H_5$, $-OCH_3$ or $-OC_2H_5$. When any of X denotes halogen, the halogen is preferably $-F$, $-Cl$ or $Br$.

DETAILED DESCRIPTION OF THE INVENTION

The compound shown in formula B, a substituted benzimidazole, may have the group $R_3O-$ in the 6-position. It is, however, to be understood that the compounds in which the group $R_3O$ is in the 5-position are also included in the invention.

It will be understood that the compounds of formulae A and B may be in the form of conventional pharmaceutically acceptable acid addition salts. The composition may also include conventional pharmaceutically acceptable carriers and diluents.

The foregoing compounds, particularly those in which $R_1$, $R_2$ and $R_3$ are members of the group consisting of hydrogen and $C_1-C_3$ alkyl groups may act to hinder or prevent the interaction of basic brain protein (of Myelin) and all mediated immune responses to this protein which occurs in demyelinating conditions such as multiple sclerosis. The compounds may also be useful in the treatment of cancer since lymphocytes of patients with cancer will react with basic brain protein immunologically and this reaction is prevented by serotonin.

Furthermore, these compounds have been shown to be inhibitors of serotonin reuptake in the brain thereby increasing neurotransmission across synapses where serotonin is the native transmitter substance. In addition, these compounds have been shown to potentiate REM (rapid eye movement) sleep in cats and therefore may have beneficial qualities as sleep inducing agents.

The invention also includes a method of treating an animal (including human beings) with a composition comprising at least one of the compounds of formulae A and B as such or in the form of its pharmaceutically acceptable acid addition salt, for example, the hydrochloride. The composition may be introduced into the body by any one of the routes conventionally employed for introducing a drug into the body. Thus, for example, the composition may be administered orally, topically or parenterally, at a dose range of 0.1–100 mg/Kg. More particularly the compounds of the invention are generally characterized by the pharmacological activity hereinbefore stated, making them useful in counteracting certain physiological abnormalities in a living animal body. Effective quantities of the pharmacologically active compounds of the invention may be administered to a living animal body in any one of various ways, for example orally as in capsules or tablets, or parenterally in the form of sterile solutions, suspensions, or by pellet implantation. Among possible routes of parenteral administration are intravenously, subcutaneously, intramuscularly and intraperitoneally. Other modes of administration are lingually, vaginally, by aerosol and topically as e.g. in the form of ointments, eye-drops etc.

As representative of living animal bodies, which may be treated with the compounds and compositions of the invention, and according to the method of treating of the invention, for alleviation of the same and/or similar conditions as those described, in addition may also be mentioned the following: domestic animals such as dogs and cats, farm animals such as horses, cows, sheep and goats.

Pharmaceutical formulations are usually prepared from a predetermined quantity of one or more of the compounds of the invention. Such formulations may take the form of powders, suppositories, ointments, eye-drops, elixirs, solutions, aerosols, pills, capsules, pellets or tablets, suspensions, oil solutions etc., with or without, but preferably with, any one of a large variety of pharmaceutically acceptable vehicles or carriers. When in admixture with a pharmaceutical vehicle or carrier, the active ingredient usually comprises from about 0.01 to about 75 percent, normally from about 0.05 to about 15 per cent, by weight of the composition. Carriers such as starch, sugar talc, commonly used synthetic and natural gums, water, and the like, may be used in such formulations. Binders such as polyvinylpyrrolidone and lubricants such as sodium stearate, may be used to form tablets. Disintegrating agents such as sodium bicarbonate may also be included in tablets.

Although relatively small quantities of the active materials of the invention, even as low as 5.0 milligrams may be used in cases of administration to subjects having a relatively low body weight, unit dosages are preferably 5 milligrams or above and preferably 25, 50, or 100 milligrams, or even higher, depending of course upon the subject treated and the particular result desired, as will be apparent to one skilled in the art. Broader ranges appear to be 0.1 to 3000 milligrams per unit dose. The active agents of the invention may be combined for administration with other pharmacologically active agents such as natural or synthetic prostaglandins or analogues, antiseptics, spasmolytics, analgesics, tranquillizers, steroids or hormones, or the like, or with buffers, antacids or the like, and the proportion of the active agent of agents in the compositions may be varied widely. It is only necessary that the active ingredient of invention constitutes an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to well established medical and/or veterinary principles. As a rule, however, when used therapeutically, the present compounds may be administered in a quantity of 1 to 1000 milligrams per day and patient, divided in 1 to 4 doses, during a period of 1 day to 1 year.

The compounds of formula A may be designated as substituted tryptamines and may be readily produced by one of the following general methods I, II and III.

METHOD I

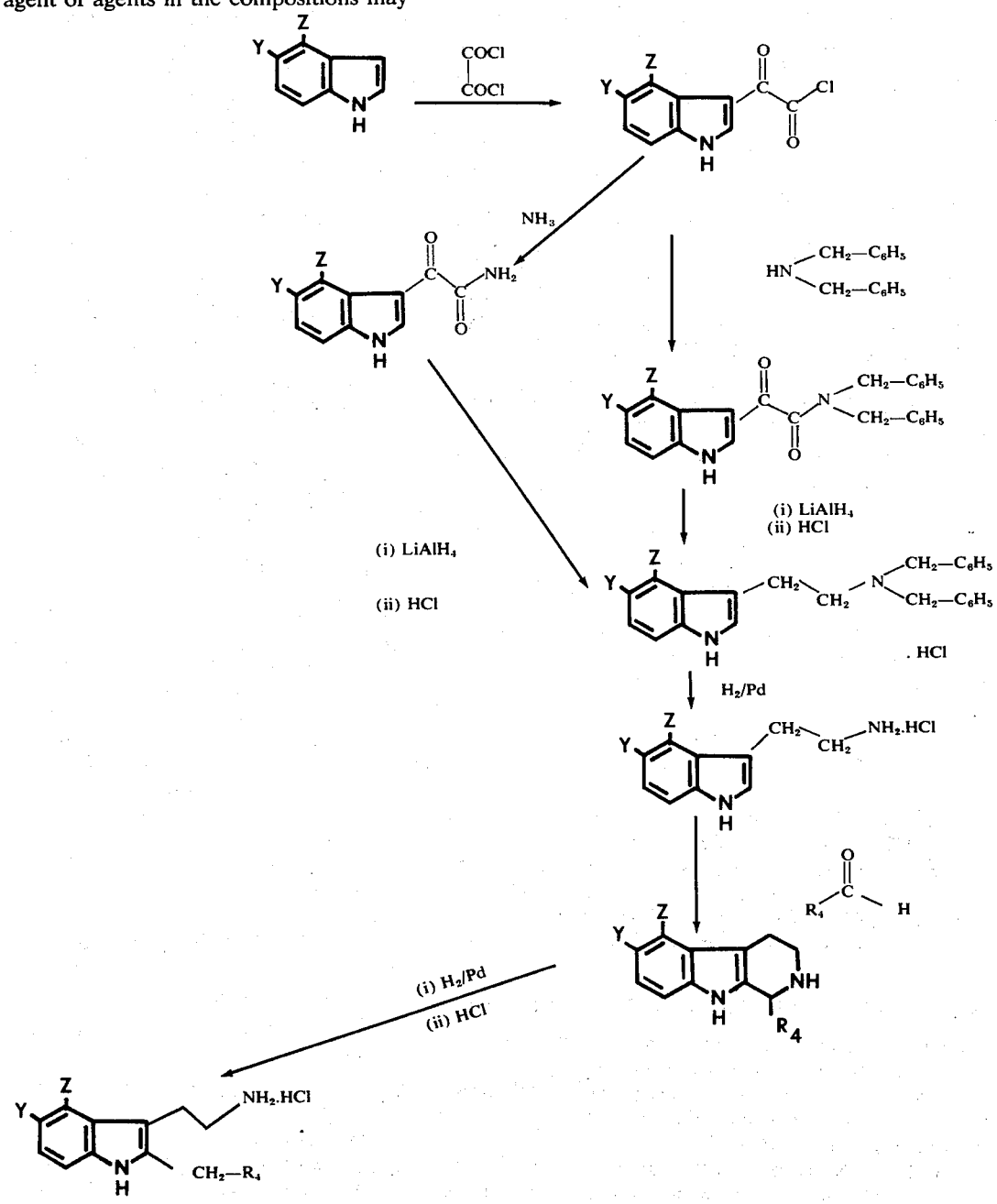

METHOD II
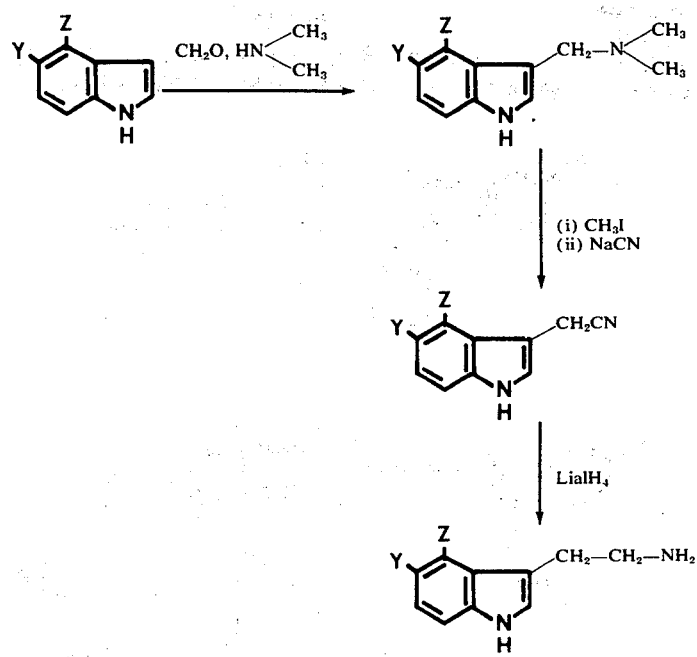
The final compound can then be condensed, as in method I, with an appropriately substituted $R_4$—CHO and the product hydrogenated to obtain the tryptamine derivative.
METHOD III
The final compound in method II can also be converted to 2-substituted tryptamine derivatives as shown below:
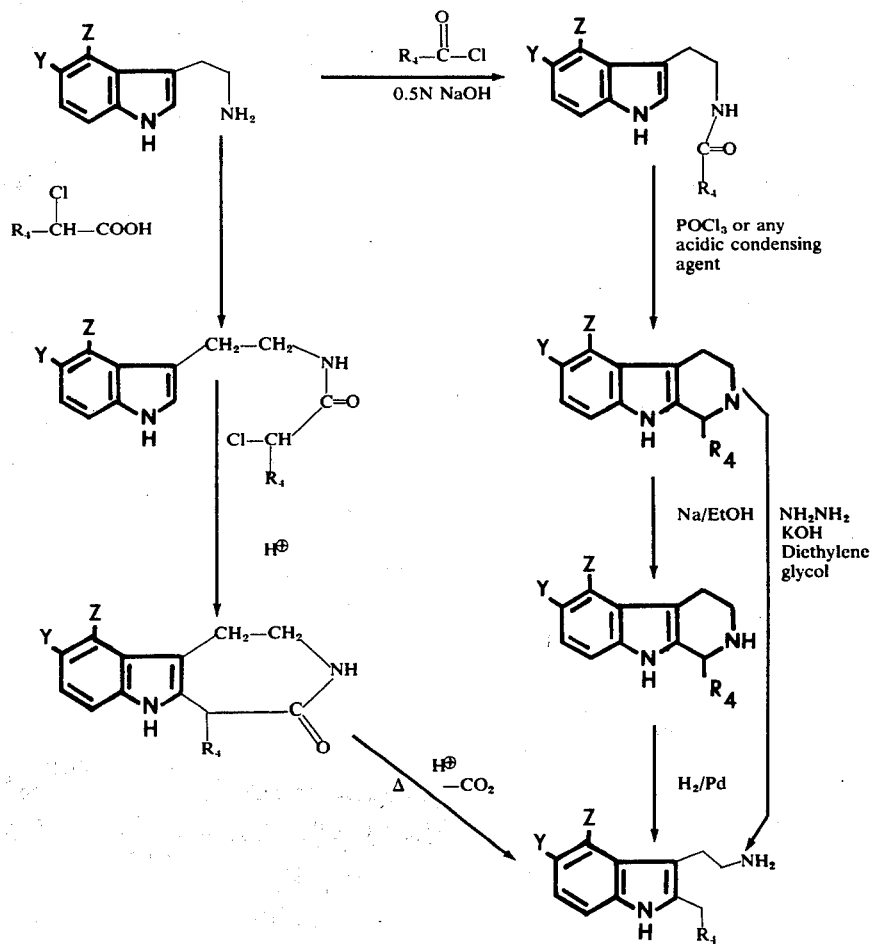

For example, the compounds of formula A may be made by reducing a 5-hydroxy- or 5-alkoxy-, 3-indolylglyoxylamide with lithium aluminum hydride and by hydrogenolysis of substituted 1,2,3,4-tetrahydro, β-carboline systems. An example of a typical synthesis of 2-benzyl-5-hydroxy-and 2-benzyl-5-methoxy-tryptamine hydrochlorides is shown below for purposes of illustration.

EXAMPLE I

Synthesis of 2-benzyl-5-hydroxy- and 2-benzyl-5-methoxytryptamine hydrochlorides (XIII and XIV).

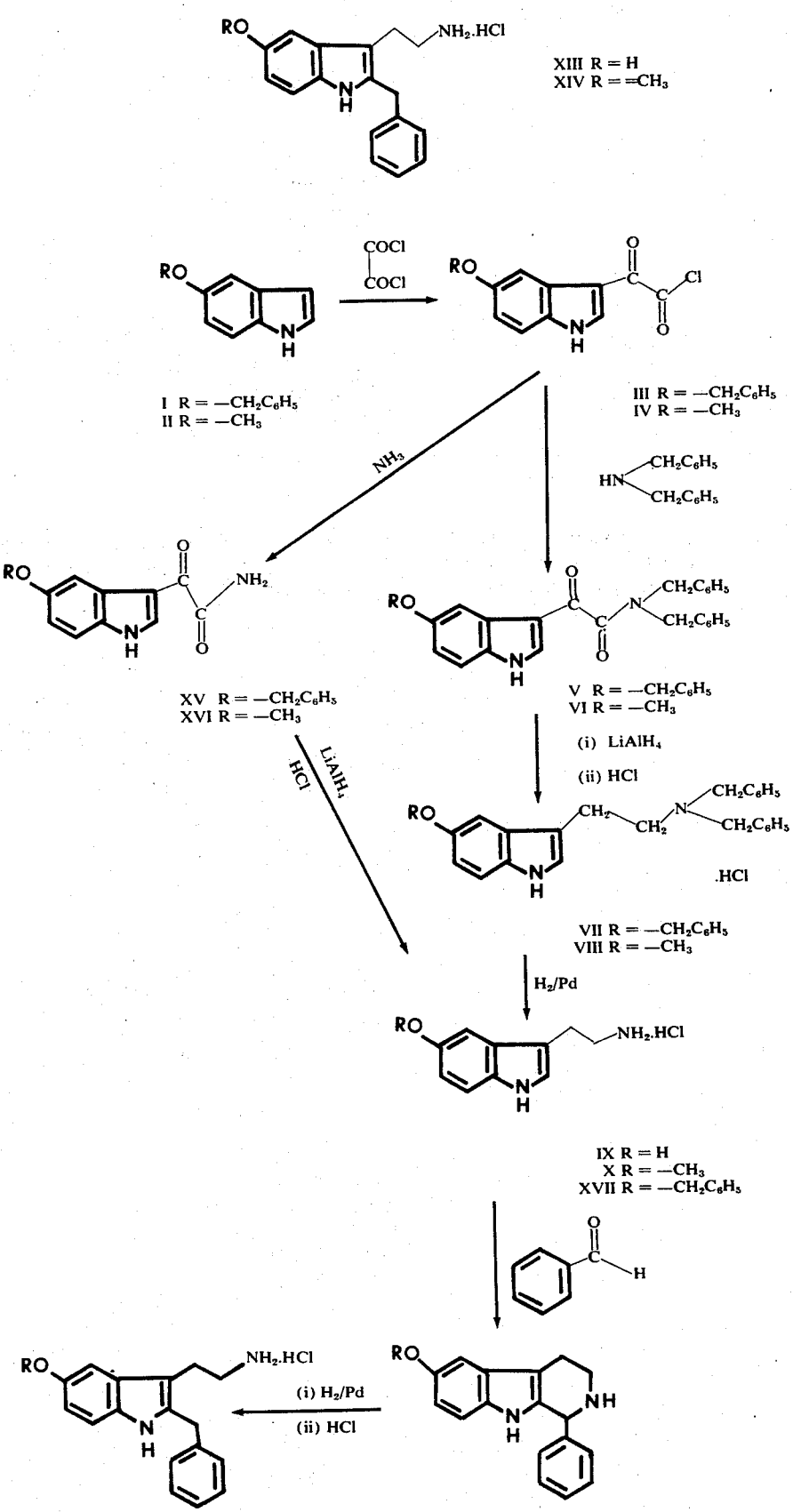

XIII R = H
XIV R = —CH₃

XI R = H
XII R = —CH₃
XVIII R = —CH₂C₆H₅

5-benzyloxy- and 5-methoxy-3indole-glyoxylyl chloride (III and IV).

5-benzyloxy indole (I) in absolute ether when treated with oxalyl chloride at 0 C gives a quantitative yield of 5-benzyloxy-3-indole-glyoxylyl chloride (III). m.p. (lit.) 146°–150° dec.

Similarly, 5-methoxy indole (II) gives a 5-methoxy-3-indoleglyoxylyl chloride (IV).

5-benzyloxy- and 5-methoxy-3-indole-N,N-dibenzyl-glyoxyl amide (V and VI).

The crude acid chloride (III) when added in small portions to dibenzylamine in ether gives a 91% yield of 5-benzyloxy-3-indole-N,N-dibenzylglyoxylamide (V) m.p. (lit.) 150°–151°.

Similarly, the acid chloride (IV) with dibenzylamine gives 5-methoxy-3-indole-N,N-dibenzylglyoxylamide (VI).

5-benzyloxy- and 5-methoxy-3-(2-dibenzylaminoethyl)-indole hydrochloride. (VII and VIII).

When the amide (V) is suspended in dry benzene and added to lithium aluminum hydride in dry ether and refluxed, it gives the reduced product, 5-benzyloxy-3-(2dibenzylaminoethyl)-indole as the hydrochloride salt in 92% yield (VII) m.p. (lit.) 232°–233°.

Similarly, the amide (VI) gives on treatment with lithium aluminum hydride 5-methoxy-3-(2-dibenzylamino ethyl)-indole (VIII) hydrochloride (VIII).

These hydrochlorides can be converted to the free bases or used as hydrochlorides in the next step (hydrogenolysis).

5-hydroxy- and 5-methoxy-tryptamine hydrochlorides (IX and X).

5-benzyloxy-3-(2-dibenzylaminoethyl)-indole hydrochloride (VII) in ethanol when hydrogenated with palladium at 35° gives 5-hydroxy-tryptamine hydrochloride (IX) in 95% yield.

Similarly, 5-methoxy-3-(2-dibenzylaminoethyl)-indole hydrochloride (VIII) gives a 5-methoxy-tryptamine hydrochloride (X).

5-benzyloxy- and 5-methoxy-3-indole-glyoxalic acid amides (XV and XVI).

5-benzyloxy-3-indole-glyoxylyl chloride (III) with 23% ammonium hydroxide gives 5-benzyloxy-3-indole-glyoxalic acid amide (XV) in 91% yield.

Similarly, 5-methoxy-3-indole-glyoxylyl chloride (IV) gives under similar conditions 5-methoxy-3-indole-glyoxalic acid amide (XVI).

5-benzyloxy- and 5-methoxy-tryptamine hydrochlorides (XVII and X).

5benzyloxy-3-indole -glyoxalic acid amide (XV) is reduced with lithium aluminum hydride in dry tetrahydrofuran to give 5-benzyloxy-tryptamine in 33% yield. This is converted with hydrochloric acid gas to the hydrochloride (XVII).

Under similar conditions, 5-methoxy-3-indole-glyoxalic acid amide (XVI) gives 5-methoxy-tryptamine, which is isolated as hydrochloride (X), obtained previously also by another route.

1-phenyl-6-hydroxy - 1,2,3,4-tetrahydro-β-carboline (XI), 1-phenyl-6-methoxy - 1,2,3,4-tetrahydro-β-car-boline (XII) and 1-phenyl-6-benzyloxy - 1,2,3,4-tetrahydro-β-carboline (XVIII).

5-hydroxy-tryptamine (IX) hydrochloride (IX) undergoes a condensation with benzaldehyde at 60° in the presence of 0.125 N sulfuric acid to give 1-phenyl-6-hydroxy - 1,2,3,4-tetrahydro-β-carboline hydrochloride. This on treatment with ammonium hydroxide at 40° for 3 hours gives the free base 1-phenyl-6-hydroxy - 1,2,3,4-tetrahydro-β-carboline (XI) in 85.5% yield.

Similarly, 5-methoxy-tryptamine hydrochloride (X) and 5-benzyloxy-tryptamine hydrochloride (XVII) given 1-phenyl-6-methoxy-1,2,3,4-tetrahydro-β-carboline (XII) and 1-phenyl-6-benzyloxy- 1,2,3,4-tetrahydro-β-carboline (XVIII) respectively.

2-benzyl-5-hydroxy-tryptamine hydrochloride (XIII) and 2-benzyl-5-methoxy-tryptamine hydrochloride (XIV).

1-phenyl-6-hydroxy - 1,2,3,4-tetrahydro-β-carboline (XI) in acetic acid is hydrogenated with 10% palladium on carbon at 80° under 6 atmospheric pressure of hydrogen until the hydrogen uptake ceases. The free base is obtained by treating with ammonium hydroxide. This is taken in ether and converted with hydrochloric acid gas to 2-benzyl-5-hydroxy-tryptamine hydrochloride (XIII).

In similar way, 1-phenyl-6-benzyloxy- 1,2,3,4-tetrahydro-β-carboline (XVIII) gives also 2-benzyl-5-hydroxy-tryptamine hydrochloride (XIII), whereas, 1-phenyl-6-methoxy- 1,2,3,4-tetrahydro-β-carboline (XII) gives 2-benzyl-5-methoxy-tryptamine hydrochloride (XIV).

Compounds having the OR₃ group in the 4-position rather than the 5-position are made in the same way, except that the starting material has the OR₃ group substituted at the 4 rather than the 5-position.

The substituted benzimidazoles, that is, the compounds of formula B, may be prepared by the following methods in which the benzimidazole taken as an example is 1-(β-amino-ethyl)-2-benzyl-6-methoxybenzimidazole (and the corresponding 5-methoxy isomer).

EXAMPLE II 4-methoxy-1, 2-phenylenediamine is condensed with benzyl cyanide in the presence of acid to give 2-benzyl-5(6)-methoxybenzimidazole. This compound is amino alkylated with 2-chloro-ethylamine in the presence of sodium ethylate to yield a mixture of 1-(β-aminoethyl)-2-benzyl-5-and 6-methoxy-benzimidazoles, which is separated to give the pure 1(β-aminoethyl)-2-benzyl-6-methoxybenzimidazole.

EXAMPLE III 4-methoxy-1,2-phenylenediamino is heated with phenylacetic acid in the presence of hydrochloric acid to give 2-benzyl-5(6)-methoxybenzimidazole. Aminoalkylation with 2-chlorethylamine to form the mixture of 1-(3-aminoethyl)-2-benzyl-5- and 6-benzimidazoles is carried as in EXAMPLE II, from which the desired 6-methoxy isomer is separated.

EXAMPLE IV

The intermediate 2-benzyl-5(6)-methoxybenzimidazole is obtained by warming 4-methoxy-1, 2-phenylenediamine with phenylacetimino methyl ether in the presence of hydrochloric acid. Conversion to the mixed 1-(β-aminoethyl)-2-benzyl-5- and 6-methoxybenzimidazoles is accomplished with 2-chloroethylamine as in EXAMPLE II, and these are separated as above.

EXAMPLE V 3-methoxyaniline (m-anisidine) is acylated with phenylacetyl chloride to form 3-methoxyphenylacetanilide. Nitration of this amide yields 2-nitro-5-methoxy-phenylacetanilide which is treated with tin and hydrochloric acid to undergo reductive cyclization to form 2-benzyl-5(6)-methoxy-benzimidazole. Aminoalkylation to a mixture of 1-(β-aminoethyl)-2-benzyl-5- and 6-methoxybenzimidazole is accomplished as in EXAMPLE II and the two isomers are separated.

EXAMPLE VI 3-methoxy-α-phenylacetanilide (described in EXAMPLE V) is n-alkylated with 2-chlorethylamine in the presence of sodium ethylate to form N-(2-aminoethyl)-α-3-methoxy-α-phenylacetanilide. That compound is nitrated to give 2-nitro-5-methoxy-N-(β-aminoethyl)-α-phenylacetanilide which on reductive cyclization with tin and hydrochloric acid yields 1-(β-aminoethyl)-2-benzyl-6-methoxybenzimidazole directly without the necessity of separating from the 5-methoxy isomer.

EXAMPLE VII

As an alternate to the route set forth in EXAMPLE VI, N-(β-aminoethyl)-3-methoxy-α-phenylacetanilide, (prepared from the reaction of m-anisidine and 2-chloroethylamine to obtain N-(β-aminoethyl)-3-methoxyaniline, the latter being condensed with phenylacetylchloride) is nitrated to give N-(β-aminoethyl)-α-nitro-3-methoxy-α- phenyl acetanilide which on reductive cyclization with tin and hydrochloric acid yields 1(β-aminoethyl)-2-benzyl-6-methoxybenzimidazole.

The production of the substituted benzimidazoles in which $R_3$ is other than methyl and/or one or both of $R_1$ and $R_2$ are alkyl groups and/or one or more of X are other than hydrogen, is within the competence of a person skilled in the art with the knowledge of EXAMPLES II to VII.

EXAMPLE VIII

In Vitro Studies on 2-benzyl-5-methoxy-tryptamine hydrochloride 2-benzyl-5-methoxy-tryptamine hydrochloride was found to cause a weak contraction of the isolated, in vitro, rat fundus similar to that produced by 5-hydroxytryptamine (5-HT), but with a strong binding capability. Dose-response contraction curves were parallel, therefore indicating similar sites and mechanism of action, but a greater than 1000 times concentration of 2-benzyl-5-methoxy-tryptamine hydrochloride was needed to produce the strong response evoked by 5-HT. The compound 2-benzyl-5-methoxytryptamine hydrochloride can act peripherally as a mild 5-HT-like agent and is highly bound to the tissue. 5-HT and 2-benzyl-5-methoxy-tryptamine hydrochloride were found to compete selectively for the same receptors, with 2-benzyl-5-methoxy-tryptamine hydrochloride demonstrating prolonged duration and activity as an inhibitor of 5-HT induced contractions.

In Vivo Studies — CNS

Interaction with serotonin is evident since 2-benzyl-5-methoxy-tryptamine hydrochloride can reduce the 5-HT depletion caused by α-4-methyl-α-ethyl-metatyramine, thus suggesting that 5-HT uptake into the 5-HT terminals can be blocked by 2-benzyl-5-methoxy-tryptamine hydrochloride in doses of 10 to 25 mg/Kg. Also the initial effect of 2-benzyl-5-methoxy-tryptamine hydrochloride on the 5-HT dependent receptor activity of the extensor hindlimb reflex was seen to be weakly stimulatory, but this response subsided in time, therefore suggesting other possible actions on the 5-HT mechanisms, such as 5-HT receptor blockage. 2-benzyl-5-methoxy-tryptamine hydrochloride was found to be equivalent to chlorimipramine in the mouse serotonin potentiation test.

In vivo tests suggest resistance to the degradative action of monoamine oxidase. 2-benzyl-5-methoxy-tryptamine hydrochloride (100 mg/Kg i.p.) elicited ataxia followed by progressive sedation in mice, which was not enhanced by the monoamine oxidase inhibitor, iproniazid.

Sedative-hypnotic effects have been investigated for 2-benzyl-5-methoxy-tryptamine hydrochloride's potential as a sleep inducing agent. 5mg/Kg oral doses increased REM (rapid eye movement) sleep in cats. However 1 and 5 mg/Kg oral doses produced no significant effect on the total sleep time or EEG sleep patterns in cats.

The foregoing data indicate that 2-benzyl-5-methoxy-tryptamine hydrochloride is an inhibitor of serotonin re-uptake in the brain, hence, its net effect is to increase neurotransmission across synapsis, where serotonin is the native transmitter substance.

In Vivo-Miscellaneous

The anti-serotonin activity of 2-benzyl-5-methoxy-tryptamine hydrochloride is further substantiated by the inhibitive effects on serotonin and histamine mediated scald-induced ear edema in mice. In this test 2-benzyl-5-methoxy-tryptamine exhibited on $ED_{50}$ of 44 mg/Kg I.p. while that of cyproheptadine was approximately 12 and methylsergide 1 mg/Kg I.p. (Steriods and methylsergide anti-cholinergics and prostaglandin synthetase inhibitors were inactive.) Serotonin-induced bronchial spasms in anesthetized cats were reduced by 76% by 0.5 mg/Kg doses (I.V.) 2-benzyl-5-methoxy-tryptamine.

2-benzyl-5-methoxy-tryptamine hydrochloride did not significantly inhibit the Experimental Allergic Encephalomyelitis hindleg paralysis in rats. 2-benzyl-5-methoxy-tryptamine hydrochloride demonstrated a low order of activity in the Passive Cutaneous Anaphylaxis test.

2-benzyl-5-methoxy-tryptamine hydrochloride has been found to be a good inhibitor of lymphocyte migration.

2-benzyl-5-methoxy-tryptamine hydrochloride has demonstratedly blocked the transport of $Na^+$ and $Cl^-$ in frog skin and human cornea.

I claim:

1. A compound having the structural formula

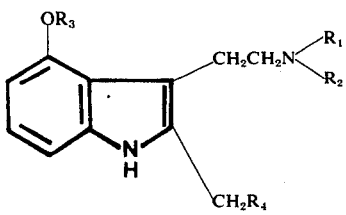

wherein each of $R_1$, $R_2$ and $R_3$ is selected from the group consisting of H and a lower alkyl group having 1–8 carbon atoms and $R_4$ is a phenyl group of the formula

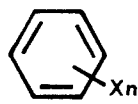

wherein $n$ is 0–5 and X is selected from the group consisting of H, a lower alkyl group having 1 to 8 carbon atoms, a lower alkoxy group having 1–8 carbon atoms, halogen, $CF_3$, $NO_2$, $NH_2$, CN, NH-lower alkyl,

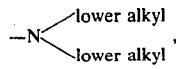

each X being the same or different or a pharmaceutically acceptable salt thereof.

2. The compound of claim 1 wherein $n$ is 0.

3. The hydrochloride acid addition salt of the compound of claim 2.

4. The compound of claim 1 wherein $n$ is 1 and X is selected from the group consisting of alkyl and alkoxy groups having 1–2 carbon atoms.

5. The compound of claim 3 wherein $R_1$ and $R_2$ are H.

6. A compound selected from the group consisting of 2-benzyl-4-hydroxy tryptamine and a pharmaceutically acceptable addition salt thereof.

7. A compound selected from the group consisting of 2-benzyl-4-methoxy tryptamine and a pharmaceutically acceptable addition salt thereof.

* * * * *